Nov. 14, 1933.  H. LANGEN  1,935,364

SPRING

Filed Oct. 8, 1931  2 Sheets-Sheet 1

Inventor:
Heinrich Langen
by Karl Michaels
Atty.

Nov. 14, 1933.  H. LANGEN  1,935,364
SPRING
Filed Oct. 8, 1931  2 Sheets-Sheet 2
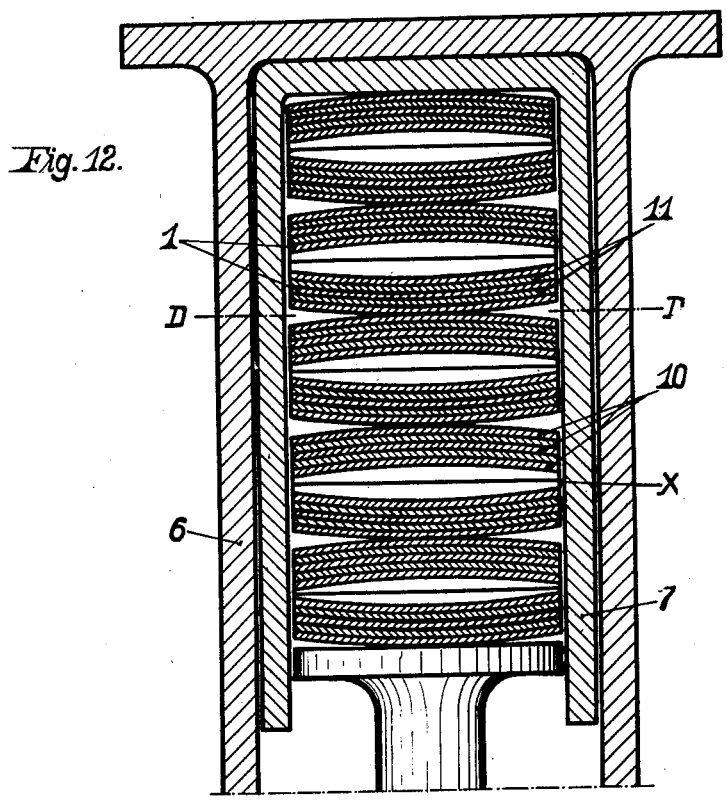
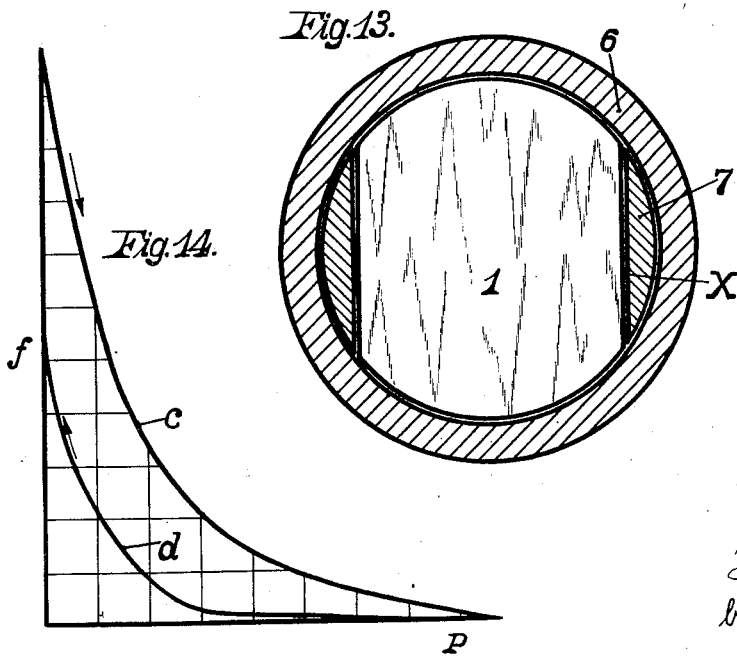
Inventor:
Heinrich Langen Patented Nov. 14, 1933

1,935,364

UNITED STATES PATENT OFFICE 1,935,364

SPRING

Heinrich Langen, Herbede-on-the-Ruhr, Germany

Application October 8, 1931, Serial No. 567,641, and in Germany September 19, 1930

6 Claims. (Cl. 213—221)

My invention relates to springs and more particularly to disc springs adapted for use as buffer springs in railway cars.

It is an object of my invention to provide a disc spring the specific deflection of which varies with increasing load according to a predetermined non-linear rate, for instance in such manner that the specific deflection decreases with increasing load.

This condition has been fulfilled by other springs well known in the art, for instance by ring springs and volute springs. However ring springs are comparatively expensive, while volute springs have shown a tendency to break, owing to the fact that these springs in consequence of their shape and mode of production cannot be tempered uniformly.

Besides this the volute springs are unsuitable wherever higher loads must be taken up, as in such cases their size and consequent consumption of space are prohibitive.

These drawbacks are avoided according to present invention by using the well known disc springs constituted by pairs of circular discs arranged with their concave sides facing each other. Now these springs have a specific deflection decreasing at a linear rate with increasing load. For practical purposes, however, it is desirable that the specific deflection of the springs decrease with increasing load at a predetermined non-linear rate. In order to accomplish this I provide discs having non-circular contours which contact with each other only in parts as long as no load is acting thereon, so that at least two gaps will be formed on opposite sides between the discs which are only gradually closed as the load increases.

In a preferred embodiment of my invention the discs are formed in two diametrically opposite places along a circular line and preferably in such manner that the centre of the arcs is the centre of the disc, while in at least two other diametrically opposite places parallel straight edges are provided. Such discs, when not loaded, contact with one another merely along the circular edges, gaps being formed between the straight edges. A disc spring formed in this manner has a non-linear deflection load characteristic.

In the drawings affixed to this specification and forming part thereof springs embodying my invention are illustrated diagrammatically by way of example.

In the drawings

Figs. 1-7 illustrate the first embodiment,

Figs. 1, 3, 5 and 2, 4, 6 being cross sections along the lines A—A and B—B in Fig. 7, respectively, and illustrating the relative position of the disc bodies with increasing load.

Fig. 12 is a vertical section of another pile or column of disc springs according to this invention, and Fig. 13 is a horizontal section on the line D—D in Fig. 12, Fig. 14 is a diagram illustrating the deflection-load characteristic of the spring column shown in Figs. 12 and 13.

Figure 1:
Figure 2:
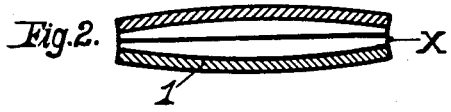
Figure 3:
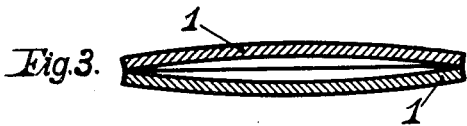
Figure 4:
Figure 5:
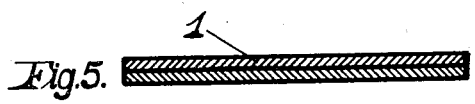
Figure 6:
Figure 7:
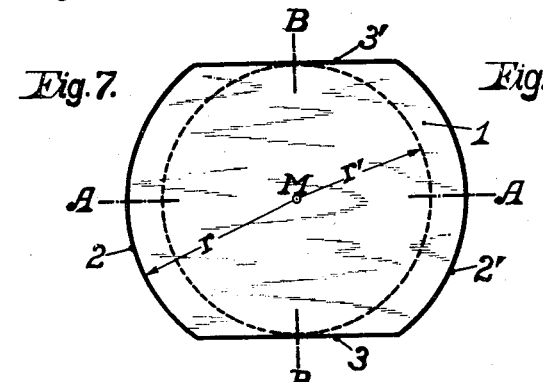
Fig. 7 is a plan view.

Referring to the drawings and first to Figs. 1-7, the disc spring is formed of two plates 1, 1 which are formed at two opposite sides 2, 2' with a circular edge cut with a radius $r$ about the centre M of the sheet. The lateral edges 3 and 3' are straight and their distance from the centre M is smaller than the radius $r$ of the arcs 2 and 2'. The plates 1 are curved as shown in Figs. 1 and 2 and arranged with their concave sides facing each other. When the spring is not loaded, the plates contact merely along the circular edges 2 and 2', while gaps $x$ are formed between the straight edges 3 and 3'.

The operation of this spring is as follows: When a load is applied to the spring the plates are deformed from the position shown in Figs. 1 and 2 to the position shown in Figs. 3 and 4 in which the gaps are closed. During this deformation the spring plates are loaded mainly along the line B—B in Fig. 7. However when the sheets reach the position shown in Figs. 3 and 4, they are loaded also in the direction A—A, so that their specific deflection is decreased. When the plates touch each other along a circle having the radius $r'$ corresponding to the distance of the side edges 3, 3' from the centre M (Fig. 7), the load acting on the discs is the same as that acting on the circular disc springs known in the art.

Figure 8:
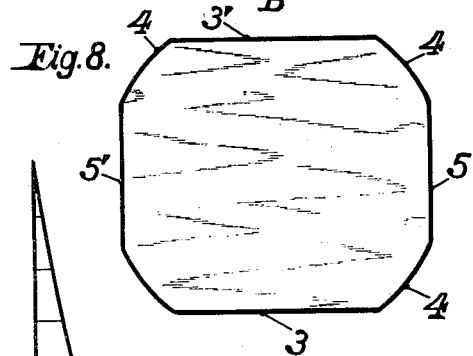
Fig. 8 is a plan view of a second embodiment.

Referring now to Fig. 8, the disc spring here shown is formed with two pairs of straight edges 3, 3' and 5, 5' and four circular edges 4. As long as the springs are unloaded, merely the circular edges 4 of the bodies are in contact while gaps are formed between the straight edges 3, 3' and 5, 5', respectively. The operation of this spring is substantially the same as that of the spring shown in Figs. 1–7.

It should be noted that the contour of the spring bodies may be changed in various ways provided only that the edges of the bodies contact only in parts when not loaded.

Figure 9:
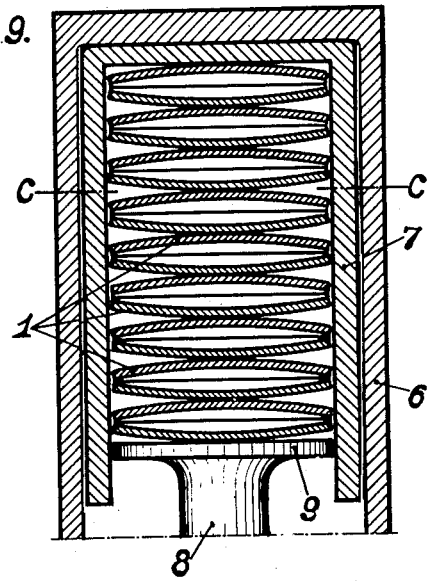
Fig. 9 is a vertical section of a pile of disc springs according to my invention, Fig. 10 being a horizontal section on the line C—C in Fig. 9.
Figure 10:
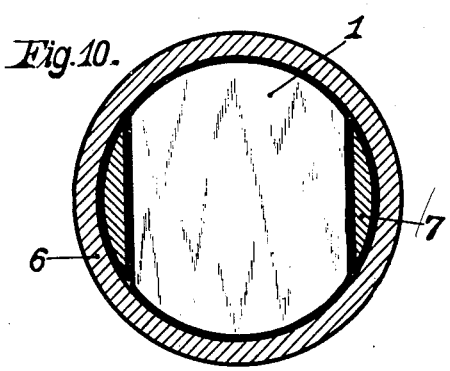

Referring now to Figs. 9 and 10 showing a pile or column of springs according to my invention, 6 is a cylinder open at one end and containing a U-shaped member 7 the legs of which have the cross section of a circular segment. 1 are spring plates formed as shown in Figs. 1–7, each pair of plates forming a disc spring. The interstices between the straight edges of the disc bodies and the cylinder 6 are filled up by the legs of the U-shaped member 7. 8 is a piston carrying a circular end plate 9 engaging the lowermost disc spring in the cylinder 6 and forming part of a buffer shank or the like.

Figure 11:
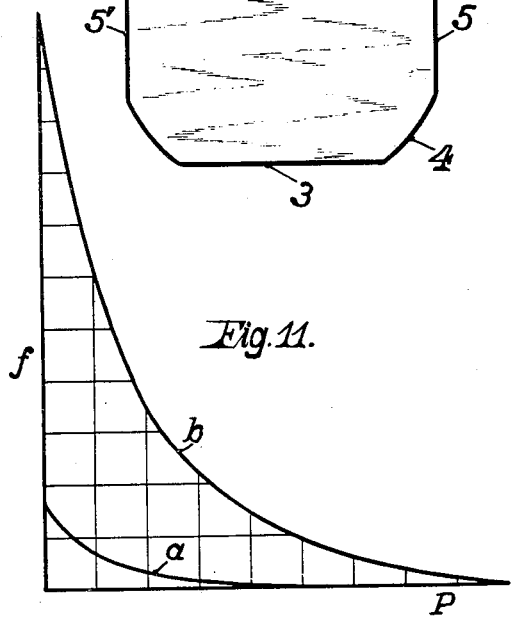
Fig. 11 is a diagram illustrating the deflection-load characteristic of a single pair of springs as shown in Figs. 1-7, and of the pile of springs shown in Figs. 9 and 10.

Referring now to Fig. 11 the curves $a$ and $b$ are deflection-load characteristics of a single spring as shown in Figs. 1–7 and of the spring column shown in Figs. 9 and 10, respectively. In this diagram the abscissæ illustrate the loads P exerted on the spring or the spring column, while the ordinates show the specific deflection $f$ of the spring or spring column. It can be seen from Fig. 11 that with increasing load the specific deflection decreases at a non-linear rate.

In Figs. 12 and 13 a spring column consisting of a cylinder 6, a U-shaped member 7 and disc bodies 1 similar to the column shown in Figs. 9 and 10 is shown. In this embodiment each disc body is formed by a plurality of, say three elastic metal plates 10, insets 11 consisting of leather, asbestos or the like being inserted between the plates. The material of the insets should be chosen in such manner that the insets have a sufficient friction coefficient relative to the metal, such as steel, forming the plates. When this column is loaded and the metal sheets are stretched, the insets are stretched also. However when the metal sheets are relieved of the load, they slide under pressure on the insets so that energy is destroyed by friction. This spring column therefore has a diagram shown in Fig. 14 which differs from the diagram of the column shown in Figs. 9 and 10 in that the compression characteristic $c$ does not coincide with the expansion characteristic $d$. When the insets are formed of fibrous material, they should be arranged in such manner that the fibres extend in parallel to the direction of the gaps $x$ between the straight edges of the plates.

I wish it to be understood that I do not desire to be limited to the exact details of construction shown and described for obvious modifications will occur to a person skilled in the art.

I claim:—

1. A disc spring comprising a pair of convex-concave discs curved evenly in more than one direction and arranged with their concave sides facing each other, the peripheral line of each disc being divided into sections, adjoining sections extending alternately on a curved surface and on a substantially plane surface at an angle to the plane of contact of said discs, respectively.

2. A disc spring comprising a pair of convex-concave discs curved evenly in more than one direction and arranged with their concave sides facing each other, the peripheral line of each disc being divided into sections, adjoining sections extending alternately on a circle and on a substantially plane surface at an angle to the plane of contact of said discs, respectively.

3. A disc spring comprising two piles of superposed convex-concave discs curved in more than one direction with the concave sides of their discs facing each other, the peripheral line of each disc being divided into sections, adjoining sections extending alternately on a curved surface and on a substantially plane surface extending at an angle to the pile axis, respectively.

4. A disc spring comprising two piles of superposed convex-concave discs curved in more than one direction with the concave sides of their discs facing each other, the peripheral line of each disc being divided into sections, adjoining sections extending alternately on a circle and on a substantially plane surface extending at an angle to the pile axis, respectively.

5. A spring column comprising a cylindrical casing, a plurality of disc springs as claimed in claim 2, arranged in said casing, a U-shaped member extending into said casing and havings legs filling up the interstices between the inner wall of the casing and the non-circular edges of said discs, and axially movable means for compressing said springs.

6. A spring column comprising a cylindrical casing, two piles of disc springs as claimed in claim 2, arranged in said casing, a U-shaped member extending into said casing and having legs filling up the interstices between the inner wall of the casing and the non-circular edges of said discs, and axially movable means for compressing said springs.

HEINRICH LANGEN.